United States Patent Office 2,920,510
Patented Jan. 12, 1960

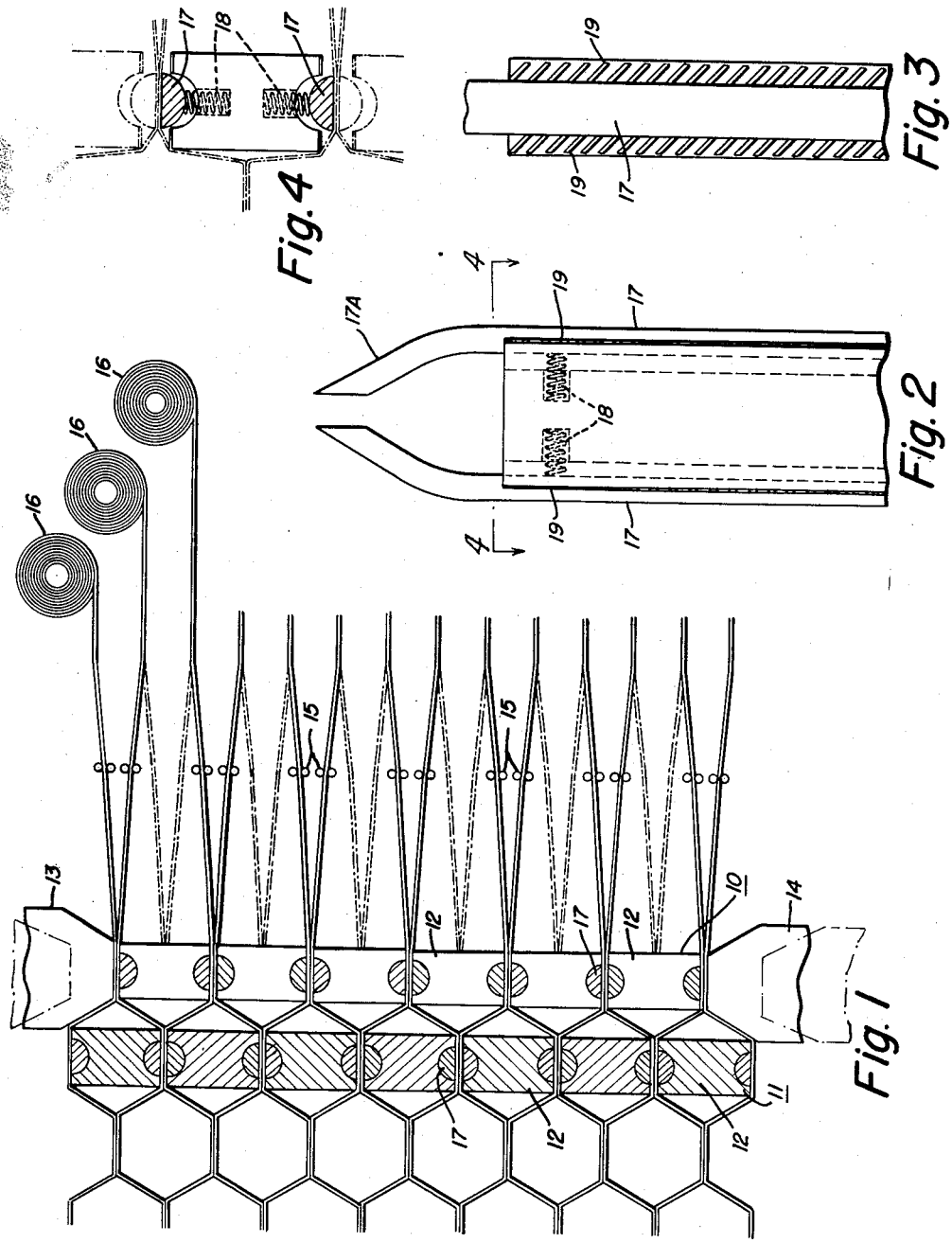

2,920,510

MULTICELLULAR EXPANDED MATERIAL AND PROCESS OF MANUFACTURING SAME

William A. Barnes, Utica, N.Y., assignor, by mesne assignments, to Kelsey-Hayes Company, Detroit, Mich., a corporation of Delaware Application October 17, 1955, Serial No. 540,759

4 Claims. (Cl. 78—82)

This invention relates to a pressure welded metal product, and to the process and apparatus for carrying out the process.

The primary object of this invention is to provide apparatus and welding processes for welding selected and varying areas within a stock of weldable members by pressure applied solely from the exterior of the stack.

Another object of this invention is to avoid the need for separate welding of the mated sections composed of united strip members.

Another object of this invention is to avoid the use of separate binding materials.

Another object of this invention is to avoid the distortion of the structural units of the expanded form by the welding process.

Still another object of this invention is to produce the structure in its expanded form without the necessity of opening the structure after welding.

And another object of this invention is to provide apparatus to produce continuous lengths of the structure.

Other objects and a fuller understanding of the invention may be had by referring to the following specification and claims, taken in conjunction with the accompanying drawings, in which:

Figure 1 is a schematic illustration of a loom embodying the principles of this invention for making a honeycomb multicellular structure;

Figure 2 is a side view of an indentor unit with spring urged stripping fingers;

Figure 3 is an end view of the indentor unit of Figure 2;

Figure 4 is a section taken along line 4—4 of Figure 2, and shows in dotted outline the relative position of two cooperating similar units; and, Figure 5 is a perspective view of the area illustrated in Figure 1, showing the relationship of the finished structure, the apparatus to weld the structure, and the unwelded webs coming to the welding stacks.

Figure 5:
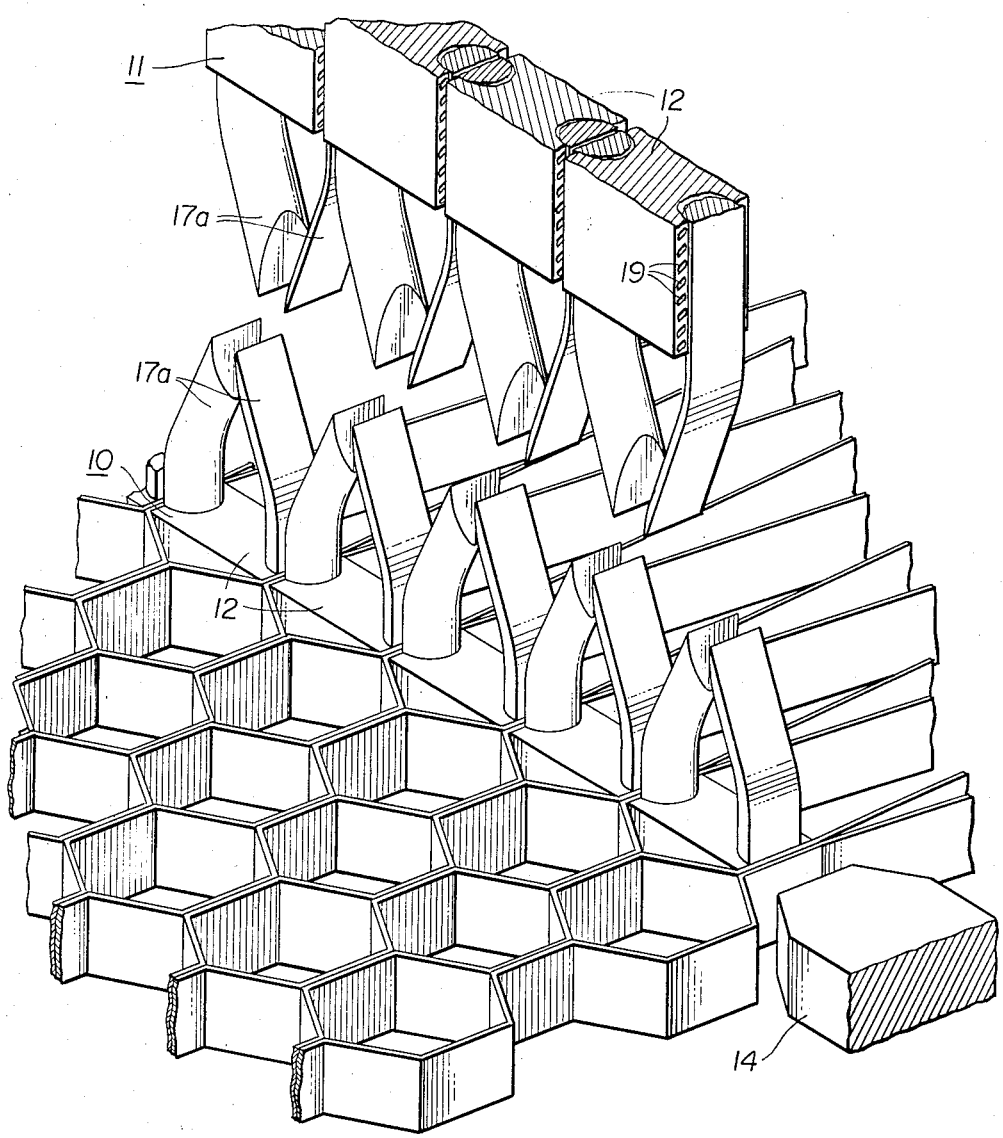

One outstanding example of useful products which can be made by the present invention is the so-called honeycomb structure widely used as a lightweight filler between skin surfaces. Aircraft structures make use of such fillers. Therefore such structure has been selected as the preferred embodiment of the invention.

Multicellular expanded material is a very useful structural material and has taken on various forms in its relatively short period of existence. Expanded metal is one form and is made from one solid parent stock. This material has found extended use in home construction as well as for load supporting surfaces. Another form, and the form with which this invention is concerned, is the honeycomb structure compounded from separate web strips joined together in a staggered relationship. Most forms of honeycomb structure have been made by slow and laborious processes, such, for example, as by hand welding of individual strips or sheets. The prior art teaches some methods of mechanically building the structure.

Very light gauge metal foil takes on most unusual strength characteristics when provided in a honeycomb form. For example, a light gauge aluminum foil when made into a multicellular honeycomb formation is capable of withstanding hundreds of pounds over a few square inches of area, whereas the individual material has practically no ability to withstand compression across the plane of the material. Because of the exceptionally high compression strength to weight ratio, aluminum multicellular structure is highly acceptable for many uses, most spectacular of which is the use as a filler for aircraft members. Such a filler gives high compression strength together with good sound deadening qualities, ability to yield with stress without failure, and, of course, the desired low weight characteristic.

Sendzimir Patent No. 2,212,481 is based upon the observation that overheated bearings when "frozen" actually have an interpenetration of the metal crystals, and therefore Sendzimir produced a process of making laminated members of steel and copper by reproducing similar conditions in a rolling mill structure. By distorting and drawing the members he causes them to gall and thereby unite. He further noted that by applying heat with pressure he could accomplish a rapid production of a multicellular expanded material by a process not theretofore available.

However, the Sendzimir process of manufacture does have many drawbacks, principally the costliness and exactness of manufacturing technique required, together with the high incidence of failure possibly by reason of the many variable factors which can enter into his process.

The present invention is principally adapted to the construction of multicellular material from cold pressure weldable materials. At the present time and for the known uses of light weight multicellular material, aluminum is the most commercially acceptable material for this purpose.

It has long been known that pressure welding at temperatures less than the normal heat welding temperature could be achieved to unite certain materials. However, until quite recently the practical commercial cold welding of these materials was not feasible. Anthony B. Sowter has been granted a series of United States patents showing various processes and applications whereby he has reduced this welding procedure to a commercially acceptable science. The inventor of this case has worked closely with Sowter and has developed other processes, tooling and dies for carrying out the basic concepts as developed by Sowter.

Throughout all of the work done by Sowter, and in the literature which has been written concerning pressure welding, it has generally been considered basic that the surfaces to be pressure welded must be freshly prepared, clean surfaces in order to produce the type of union desired. Sowter has specified that the only really acceptable clean surface is one produced by an abrading action such as by scratch brushing.

It has now been discovered that very thin foil sections can be successfully pressure welded without providing a scratch surface if the thin foil is employed in a clean condition as it comes from the rolling operation. This recognition is based upon the discovery that a good and acceptable weld is produced by an extreme pressure across a limited area, which pressure is uniformly and continuously applied to produce interface surfaces which are outwardly expanding and in constant motion. With thin sections such expanding surfaces produce a sufficiently severe flow to permit welding without scratch brushing.

Advantage is taken of this discovery to produce a controlled welding within a stack of stock material away from actual contact with the weld indentors employed to produce a pressure weld. This will be more fully explained in connection with Figure 5 of the drawings.

In Figure 1 there is illustrated a continuous loom for making expanded multicellular honeycomb structure from a plurality of individual strips of foil. Two lines or stacks of welding units 10 and 11 are illustrated in Figure 1. Each line consists of a series of individual dies 12 having a plurality of welding indentors 19 (Figures 2 and 3) on the opposite faces thereof. The indentors are shown in herringbone relationship as an example. The indentors 19 of each die 12 cooperate with like welding indentors of the next adjacent die.

Each line 10 and 11 is carried by shuttle means capable of withdrawing a line from the work area and placing the line back into the work area in a forward position of the other line. Thus as each line serves its dual purpose in completing a weld and holding the structural formation until the next line has drawn the material into shape, it may be withdrawn and inserted ahead of the second line. There are many ways in which these lines 10 and 11 may be held and shuttled. Any one of such means will be useful and acceptable. Therefore it is believed that detailed illustration of any one means will add nothing of value to the teaching herein intended.

In Figure 1 a plurality of foil rolls 16 are adapted to feed the stock material to the loom. Each foil strip is fed through oscillating foil guides 15. Guides 15 shift laterally for opening and closing areas alternately between adjacent foil strips. In Figure 1 the full line position of the foil through the foil guides indicates one position of the guides, and the dotted line indicates the position of the foil guides and the foil in the second position. It can be seen, therefore, that the dies 12 of the line 10 may be withdrawn from the position illustrated in Figure 1 and inserted between the foil strips forward of the line 10 after the guides 15 have moved the foil to the dotted outline position. The dies 12 of the lines 10 and 11 are offset in order to produce welds at the required positions for a conventional honeycomb construction.

The stacks 10 and 11 of the welding die units 12 may be carried (as an example) on expanding scissors-type holding racks, which are capable of successively inserting and withdrawing each of the die unit stacks into and out of the path of the foil strips, and also are capable of shuttling the die stacks with and counter to the progress of the foil strip travel. One of these die stacks (10 or 11) is inserted between the foil strips into the path of foil travel in advance of the welding stack (to the right of pressure heads 13 and 14 in Figure 1), and then progresses with the foil into the welding line, where pressure is produced by welding heads 13 and 14. Then, after welding and expanding to strip the welds from indentors 19, the die stack progresses with the foil travel out of that pressure line (continuing to the left in Figure 1). The foil guides 15 then offset to the dotted position to receive a second stack of weld units which, after a performance identical to that described above of the first stack of weld units, forms the hexagonal webs in conjunction with the first stack. The first stack is then removed to be inserted forward of the second stack (to the right in Figure 1), and is made to perform over again. The second stack is then moved forward in the same way, and this successive continuing performance of the two die stacks produces the desired mass honeycomb structure.

Figure 2 illustrates in more detail the construction of the dies 12 and the use of stripping fingers 17 therewith to cause the separation of the welded areas from the indentors 19. The indentors tend to adhere to the strips and need to be separated therefrom. The fingers extend between the faces of mating dies 12 and are urged apart by means of a spring 18. Then, when the pressure is removed from the pressure heads 13 and 14, the stripping fingers 17 separate under the urge of springs 18 and allow the lateral removal of dies 12 from the welded structure.

There are two stripping fingers 17 for each die. The fingers 17 have tip ends 17A which cooperate with one another in each couple by sloping together to form a reduced nose. Thus, proper entry between foil strips is assured and damage to the strips is eliminated.

With further reference to Figure 1 it will be observed that in superimposing a number of welding indentors one after the other and impressing pressure to weld upon all by pressure contact with the end members only, that this invention provides a new principle in apparatus to perform cold pressure welding operations and one of great value where a multiplicity of such welds are to be made either in thin material such as foil or thicker materials such as sheets.

Although the invention has been described in its preferred form with a certain degree of particularity, it is understood that the present disclosure of the preferred form has been made only by way of example and that numerous changes in the details of construction and the combination and arrangement of parts may be restored to without departing from the spirit and the scope of the invention as hereinafter claimed.

I claim:

1. A welding stack for welding at a plurality of separate stations simultaneously, comprising, a plurality of welding dies in stacked alignment, each welding die having a weld face positioned for cooperative weld action with the opposed face of an adjacent die, said opposed faces all lying substantially in parallel planes, each said face having a groove therein, a workpiece stripping device residing in said groove, and resilient means urging said stripping device out of said groove.

2. A welding stack for welding at a plurality of separate stations simultaneously, comprising, a plurality of substantially rectangular welding dies in stacked alignment, each welding die having a side edge weld face positioned for cooperative weld action with the opposed face of an adjacent die, said side edge faces each having a longitudinal groove therein from end to end, a workpiece stripping rod residing in said groove, said rod having a first end projecting beyond one end of said die, a second end projection beyond the other end of said die, said first and second ends curved inwardly toward the centerline of the die to thereby act as a guide to direct the die between opposed webs to be welded, and resilient means urging said rods out of said grooves.

3. A welding stack for welding at a plurality of separate aligned stations simultaneously, comprising, a first extreme die having first and second oppositely directed pressure weld formation faces, a second extreme die having first and second oppositely directed pressure weld formation faces, at least one intermediate die having first and second oppositely directed pressure weld formation faces, said first and second extreme dies and the intermediate die arranged in an aligned stack with the pressure weld formation faces thereof in opposed cooperative relationship, and means applying a compressive force to said stack in a direction through the stack for welding a series of workpieces simultaneously.

4. In a welding stack as defined in claim 3, each said die having a longitudinal center line with the weld face thereof extending generally parallel thereto, said weld formation face having a longitudinal groove therein, a workpiece stripping rod residing in each said groove, said rod having an end projecting beyond one end of said die, said end curved toward said center line to thereby act as a guide to direct the die between opposed webs to be welded, and resilient means urging said rods out of said grooves.

(References on following page)

References Cited in the file of this patent

UNITED STATES PATENTS

| | | |
|---|---|---|
| 1,961,144 | Griffith | June 5, 1934 |
| 2,144,231 | Schwarz | Jan. 17, 1939 |
| 2,210,710 | Diamond et al. | Aug. 6, 1940 |
| 2,212,481 | Sendzimir | Aug. 20, 1940 |
| 2,427,597 | Garner et al. | Sept. 16, 1947 |
| 2,445,801 | Partiot | July 27, 1948 |
| 2,607,109 | Reynolds | Aug. 19, 1952 |
| 2,639,633 | Sowter | May 26, 1953 |
| 2,701,483 | Foxon et al. | Feb. 8, 1955 |
| 2,703,998 | Sowter | Mar. 15, 1955 |
| 2,745,300 | Barnes | May 26, 1956 |